May 16, 1967  R. W. SUTTON  3,320,076
METHOD OF RECLAIMING CALCINED KAOLIN
FROM DE-INKING SLUDGE RESIDUE
Filed May 19, 1965  2 Sheets-Sheet 2

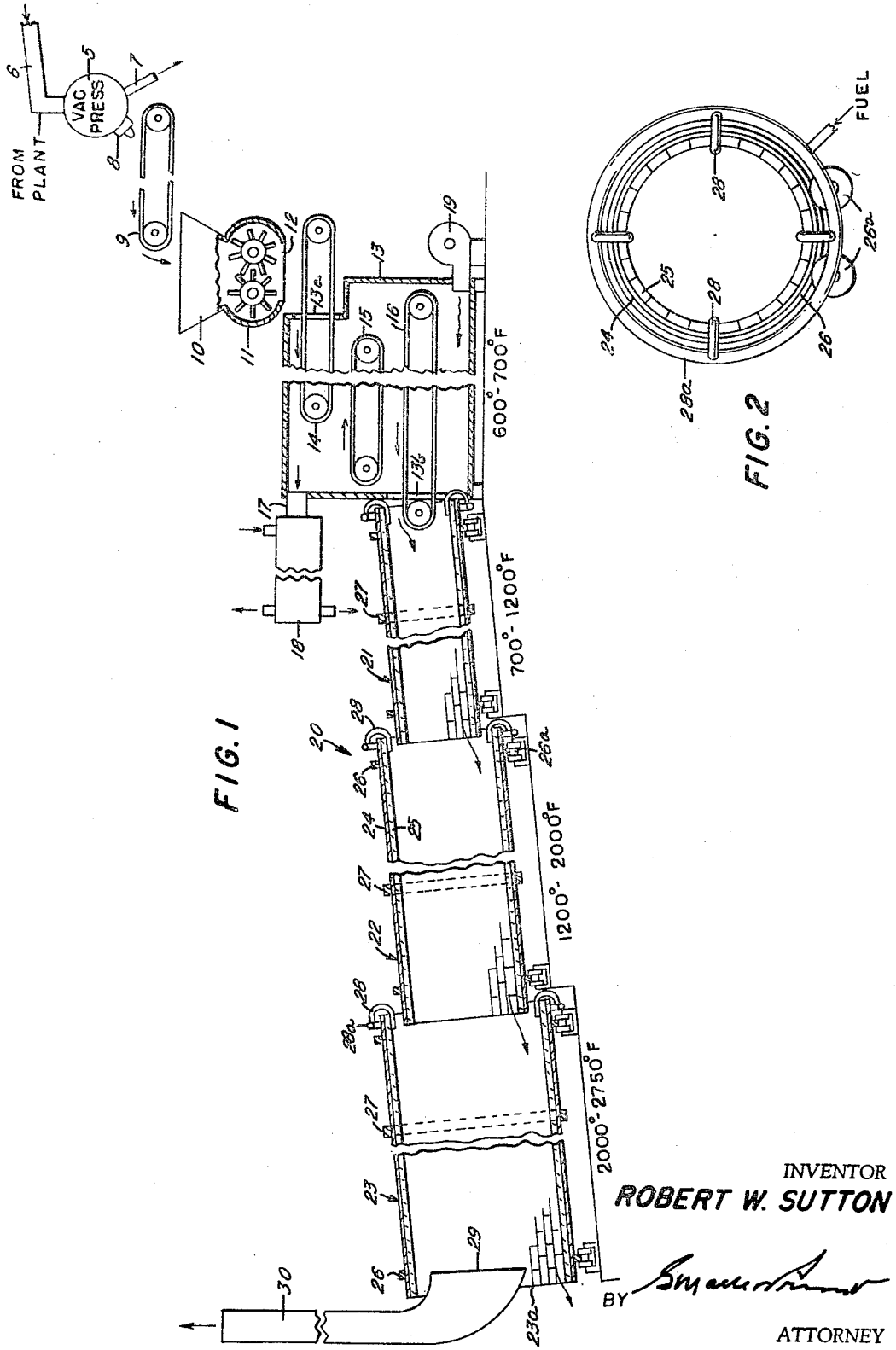

INVENTOR
ROBERT W. SUTTON

BY

ATTORNEY

United States Patent Office 3,320,076
Patented May 16, 1967

3,320,076
METHOD OF RECLAIMING CALCINED KAOLIN FROM DE-INKING SLUDGE RESIDUE
Robert W. Sutton, Falls Church, Va., assignor to The Hydrand Corporation, Lake Barcroft, Va., a corporation of Delaware
Filed May 19, 1965, Ser. No. 457,146
1 Claim. (Cl. 106—72)

This invention relates to a method for recovering calcined kaolin from the residue from a conventional de-inking process of a fine paper manufacturing plant and the present application is a continuation-in-part of my copending application Ser. No. 233,549, filed Oct. 29, 1962, now U.S. Patent No. 3,188,751.

As explained in my said copending application, in the manufacture of fine papers, large quantities of rags, old newspapers, magazines and other printed materials are re-processed, and in order to properly condition these materials for the paper manufacturing plant, they must first be treated in a de-inking process. For many years, the residue or sludge from these de-inking processes which comes out of the paper mill, mixed with great quantities of dirty water, has created a tremendous problem because of the resultant pollution of streams and likes in the vicinity of the mill. Usually, this residue is simply discharged into settling basins and ultimately piled on the ground in huge mounds, and it has been impossible to prevent the rains from carrying the water off of these mounds along with certain deleterious matter in the residue, and ultimately depositing it in streams and lakes, and as a result, many valuable fish and water life are killed.

It is an object of the present invention to provide a method whereby this heretofore useless and objectionable residue from the de-inking process can be converted into a highly useful product.

Another object of the invention is to provide a method of treating de-inking sludge, and by selective control of a progressive heat treatment, producing a high quality calcined kaolin.

With the above and other objects in view which will appear as the description proceeds, the invention consists in the novel features herein set forth, illustrated in the accompanying drawings, and more particularly pointed out in the appended claim.

Referring to the drawings in which numerals of like character designate similar parts throughout the several views:

FIG. 1 is a diagrammatic view showing a longitudinal section of the apparatus employed in practising this invention as disclosed in my said Patent No. 3,188,751;

FIG. 2 is an enlarged end elevational view of a typical drum of the progressive heating assembly of the apparatus.

Figure 3:
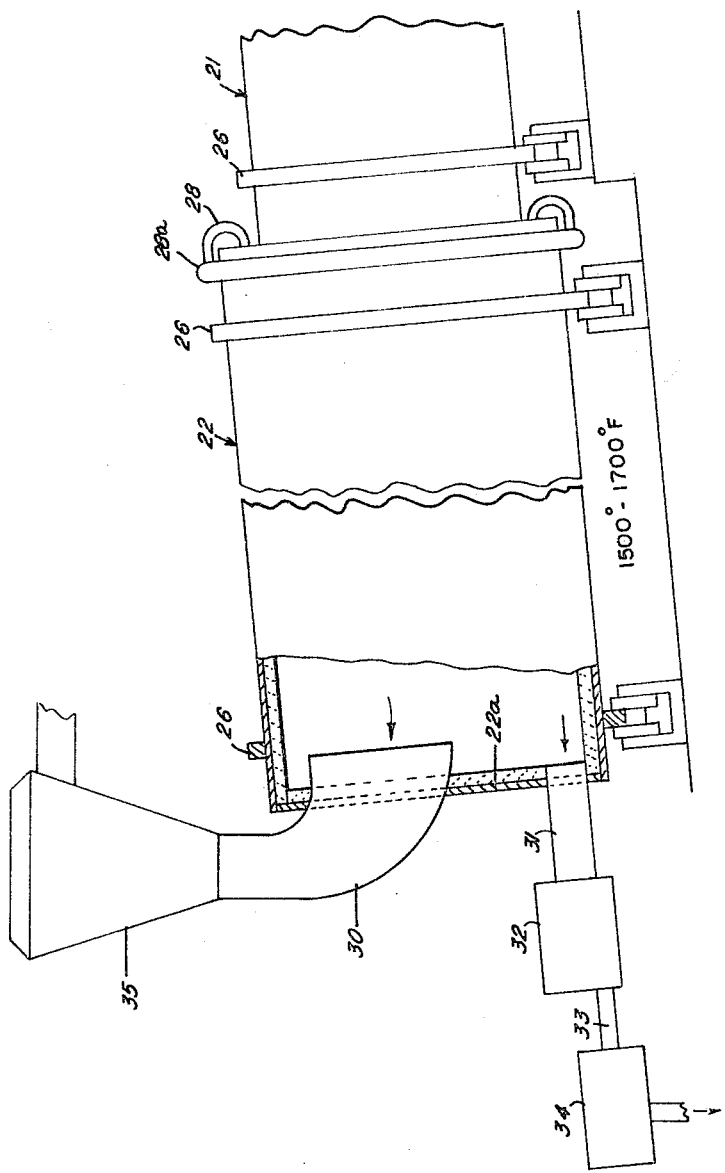
FIG. 3 diagrammatically illustrates the present modification of the apparatus shown in FIG. 1, for the recovery of calcined kaolin.

In the drawings which are simply for illustrating one form of apparatus for practising the invention 5 represents a conventional vacuum press which is located at the sludge outlet of the de-inking plant (not shown), where the sludge, containing from 18-35% moisture, is fed to the vacuum press, through a discharge conduit or the like 6. As will later appear, two or more of these vacuum presses may be employed and alternately arranged so that while one is in operation, another is being charged with sludge. The liquid extracted by the vacuum press 5 is discharged through outlet 7 into tank cars or large road trucks, and it is interesting to note that this material has been found to be useful as a road binder, and it also has properties which enable it to kill weeds along the sides of the road.

In the vacuum press, the major portion of the moisture is removed from the sludge, which is discharged through a suitable outlet 8 onto an endless conveyor 9 which deposits it in the hopper 10, of any suitable lump breaking device 11 where the masses of vacuum pressed sludge are broken up into sizes suitable for conveying through the system. Analysis of the material discharged from the vacuum press through outlet 8 shows that it comprises the following ingredients substantially in the proportions indicated:

|  | Percent |
|---|---|
| Moisture | 2.4 |
| Volatile materials | 31.16 |
| Fixed carbon | 2.74 |
| Ash | 63.70 |
| Sulphur | .10 |

From the lump breaking device 11, the material is discharged through outlet 12 onto a series of endless conveyors which conduct it through a preliminary drying chamber 13, maintained at a temperature of from 600°–700° F. The top conveyor 14 initially introduces the material into the upper portion of the drying chamber 13, through inlet 13a, and deposits it upon an oppositely traveling conveyor 15 which, in turn, deposits it on a conveyor 16, the discharge end of which extends through the discharge opening 13b in the drying chamber and terminates within the inlet end of the drying kiln.

Preferably, the vapors generated in the drying chamber 13 are discharged through outlet 17 to a suitable condenser 18, and either an oil fired or gas fired blower-burner 19 may be employed for the purpose of heating the drying chamber.

A kiln assembly, generally indicated by the numeral 20, comprises a series of progressively heated drums 21, 22 and 23, which, as shown in FIG. 1, are preferably arranged in declining relation from inlet to outlet, as and for the purpose hereinafter described. Except for size, each of the drums of the kiln 20 are similarly constructed and comprise an outer shell 24 of cylindrical form, internally lined with fire brick 25, designed to withstand the required high temperature conditions of the kiln. The smaller or inlet drum 21 of the series is arranged with its inlet end adjacent the outlet opening 13b of the drying chamber for receiving the discharge end of the final endless conveyor 16, and its discharge end fits within the inlet end of the next larger drum 22 which, in turn, is arranged with its discharge end within the inlet end of the final and larger drum 23. Each of these drums is provided with peripheral guide rings 26, running on rollers 26a of any suitable type, and the outer peripheries of the drums carry ring gears 27, respectively adapted for operative engagement with driving gears (not shown), whereby the drums may be constantly rotated throughout the operation of the kiln, the declining relation of the series of drums causing the material deposited in the kiln to progressively advance by gravity and agitation, from one drum to the next.

At the inlet end of each drum, I provide a series of jet burners 28, either gas or oil fired, preferably connected to a manifold 28a, in annularly spaced relation and directed longitudinally of the drums so as to equally distribute the heat introduced into the drums. The discharge end 23a of the final drum 23 is closed at its upper portion by a hood 29 which discharges the fumes from the kiln through a suitable stack 30.

When practising the method described in my said copending application, the temperatures maintained in the respective drums 21–23 are preferably as follows:

| | °F. |
|---|---|
| Drum 21 | 700–1200 |
| Drum 22 | 1200–2000 |
| Drum 23 | 2000–2750 | and it is important to note that these three stages of controlled heat treatment are essential to the successful operation of that method.

In the course of my experimentation with this progressive heat treatment of de-inking sludge to produce building aggregate, I discovered that due to the inclusion of certain basic ingredients in the de-inking sludge, other industrially usable products can be reclaimed by selectively controlling the temperature maintained during the heating operation. More particularly, I discovered that calcined kaolin can be recovered in this process by eliminating the step of heating the material in the final heating drum 23 and controlling the temperature range in drum 22, so that the material being treated is subjected to progressively increased temperatures within the range of from 700–1700° F.

Manifestly, the various industrial uses for calcined kaolin render it a potentially valuable product which can be reclaimed from de-inking sludge residue by the present process. Among the uses for this product are those by the paint industry as extending pigments, manufacturers of cosmetics, pharmaceutical products, rubber products, plastics, and as binders for ceramics.

Analysis of an illustrative sample of the underflow sludge from a de-inking process showed that it includes the major elements in the make-up of kaolin, namely, silica, aluminum oxide and titanium dioxide and calcium. This, plus the known industrial uses for this product, clearly indicated the desirability of modifying the method of the invention to effect the production of kaolin. Such modified method is illustrated diagrammatically in FIG. 2 of the drawings where it will be seen that the final heating drum 23 has been eliminated and the outlet end of drum 22 is closed by an end wall 22a. The stack 30 is connected into the end wall 22a through a suitable opening, as shown, and at the lower edge of the stationary end wall an outlet conduit 31 leads to a suitable cooler 32 which, in turn, is connected by conduit 33 to any conventional bagging mechanism 34. The upper end of the stack 30 communicates with a suitable filter 35 of conventional form, such, for example, as a cyclone and glass bag filter. The other parts of the apparatus are the same as those previously described and operate in substantially the same manner.

Analyses of various samples of material discharged from the vacuum press through outlet 8 shows that the ash content of this vacuum press discharge includes the major ingredients of kaolin, namely, silica ($SiO_2$) within the range of from 45 to 53%; aluminum oxide ($Al_2O_3$) within the range of 39 to 46%; titanium dioxide ($TiO_2$) approximately 4.38%, and calcium (CaO) approximately 5%. The balance of the charge included the following elements in amounts less than 0.1%, namely, boron, cobalt, iron, lead, magnesium, manganese, nickel, potassium, silver and vanadium.

This kaolin extracting process proceeds substantially in the manner previously described with respect to the production of building aggregate, including the temperature ranges up to the heating drum 22, from which the calcined kaoline is recovered. In this heating drum 22, it has been found that the temperature range to be maintained is between 1500° and 1700° F., depending upon the machine size.

In the course of the process, the minor ingredients, boron, barium beryllium, cobalt, chromium, copper, gallium, iron, lead, magnesium, nickel, potassium, silver, sodium and vanadium are disposed of through a stack 30 as fly ash and the combined silica, aluminum oxide, titanium dioxide and calcium, forming the calcined kaolin, are discharged through conduit 31 and cooled in cooler 32, after which the product is conducted to any suitable bagger 34.

A quantitative chemical analysis of a sample of the calcined kaolin discharged from drum 22, as compared with a sample of virgin kaolin, showed the following:

| | Virgin Kaolin, Percent | Extracted Calcined Kaolin, Percent |
|---|---|---|
| Silica, $SiO_2$ | 52.50 | 49.14 |
| Aluminum Oxide, $Al_2O_3$ | 44.99 | 41.03 |
| Titanium Dioxide, $TiO_2$ | 2.29 | 4.38 |
| Calcium Oxide, CaO | 0.10 | 5.00 |

It may be noted that the substantial absence of calcium oxide from the virgin kaolin analysis and the showing of 5% calcium oxide in the extracted calcined kaolin analysis is accounted for by the fact that calcium oxide had been added as is usual, in the manufacture of the paper which had undergone the de-inking process and produced the residue forming the calcined kaolin.

Physically, these samples were found to be very comparable. Visually, the extracted kaolin showed a brightness of 82.8 as compared with a brightness of 84.6 for the virgin kaolin. The brightness was determined, using MgCl as 100.

The calcined kaolin discharged from drum 22, in addition to having a high degree of brightness, was found to be well within industrial requirements from the standpoint of fineness in micron range.

The kiln gases were cleaned in the cyclone and glass bag filter 35 and the dust there collected was treated in a single hearth skinner roaster to burn off the remaining carbon, which produced a product substantially similar to that produced in the kiln.

It has been found that in addition to temperature control, the brightness of the calcined kaolin produced by this process, also depends on careful control of the draft through the system and the primary air introduced. Correspondingly, the time element from the initial drying zone to the point of discharge from the final heating zone 22 is related to the temperature and draft control. It has been found that a time element in this respect is preferably from 25–30 minutes, depending upon the size of the machine.

It was also noted that an increase in brightness followed an increase in temperature. The kiln temperature that produced a product of a brightness of 77 or 78 at 1200° F. was increased to a brightness of 85 by increasing the temperature to above 1300° F.

It was also found that a suitable product could be produced from the collector dust. A single hearth skinner roaster was charged with 190 grams of dust and operated for an hour at 1350° F. A calcined kaolin product was produced that appeared to have a brightness of at least 80. There was no dust loss while operating the roaster.

It will, of course, be understood that while the foregoing description relates primarily to the discharge from a de-inking apparatus, the material charged to this system may be from piles of dried de-inking residue or from pit sludge. In other words, any charging material derived from a de-inking process, containing the required ingredients for calcined kaolin, may be charged to this system within the spirit of this invention. Of course, if dry residue from a pile is employed, it will be necessary to slurry the material to produce a homogeneous mixture to facilitate handling, and then run it through the system above described.

It is also considered within the spirit of this invention to use as a charging material, any sludge which contains as its major ingredients silica, aluminum oxide, titanium dioxide and calcium, which collectively form clays or kaolin, regardless of whether or not they originated as a de-inking sludge. In other words, this same process above described can be practised with equal effect when using other residues or sludges including the required ingredients.

It may be noted at this point that the ingredients listed in the parent application above referred to, and particularly the ash, include the silica, aluminum oxide, titanium dioxide and calcium, which are of critical importance if calcined kaolin is to be reclaimed.

From the foregoing, it is believed that the invention may be readily understood by those skilled in the art without further description, it being borne in mind that numerous changes may be made in the details disclosed without departing from the spirit of the invention as set forth in the following claim.

I claim:

A method of recovering calcined kaolin from the ash content of the sludge residue of a convenitnal de-inking process employed in paper manufacture, said residue having substantially the following analysis:

| | |
|---|---:|
| Moisture | 2.40 |
| Volatile material | 31.16 |
| Fixed carbon | 2.74 |
| Ash | 63.70 |
| Sulfur | .10 |
| | 100.10 | said ash content including the following ingredients within the quantity ranges indicated:

| | Percent |
|---|---:|
| Silica | 45–53 |
| Aluminum oxide | 39–46 |
| Titanium dioxide, approximately | 4.38 |
| Calcium oxide, approximately | 5 | in addition to minor quantities of ingredients, including boron, cobalt, iron, lead, magnesium, manganese, nickel, potassium, silver and vanadium; said method consisting of removing the major portion of any liquid contained in said residue, breaking the latter into particles, conveying said particles through an initial drying zone to reduce the moisture content thereof to from 18–35%, agitating said particles while conducting the same through a plurality of heating zones, sequentially maintained at progressively increased temperatures from the first heating to the last, within the range of from 700° F.–1700° F., wherein the final heating zone is maintained at a temperature of from 1500–1700° F., removing said minor quantities of ingredients from said ash content during passage through said heating zones, discharging the calcined kaolin from the final heating zone, and cooling the discharged calcined kaolin.

References Cited by the Examiner

UNITED STATES PATENTS

| | | | |
|---|---|---|---|
| 2,585,116 | 2/1952 | Gronroos | 106—72 |
| 2,928,751 | 3/1960 | Lyons | 106—72 |
| 3,014,836 | 12/1961 | Proctor | 106—72 |
| 3,188,751 | 6/1965 | Sutton | 162—4 |

TOBIAS E. LEVOW, *Primary Examiner.*

S. E. MOTT, *Assistant Examiner.*